United States Patent
Knecht

(10) Patent No.: US 8,950,071 B2
(45) Date of Patent: Feb. 10, 2015

(54) METHOD AND DEVICE FOR MANUFACTURING A HEAT-INSULATED PIPE

(75) Inventor: Karl Knecht, Rickenbach-Egg (DE)

(73) Assignee: Brugg Rohr AG Holding, Brugg (CH)

( * ) Notice: Subject to any disclaimer, the term of this patent is extended or adjusted under 35 U.S.C. 154(b) by 422 days.

(21) Appl. No.: 12/921,939

(22) PCT Filed: May 5, 2010

(86) PCT No.: PCT/CH2010/000118
§ 371 (c)(1),
(2), (4) Date: Oct. 28, 2010

(87) PCT Pub. No.: WO2010/127463
PCT Pub. Date: Nov. 11, 2010

(65) Prior Publication Data
US 2011/0047774 A1 Mar. 3, 2011

(30) Foreign Application Priority Data
May 5, 2009 (EP) .................................... 09006098

(51) Int. Cl.
*F16L 9/18* (2006.01)
*F16L 9/14* (2006.01)
*B29C 65/00* (2006.01)
(Continued)

(52) U.S. Cl.
CPC ........... *B29C 44/1242* (2013.01); *B29C 33/304* (2013.01); *B29C 33/76* (2013.01); *F16L 59/143* (2013.01)
USPC ............... 29/890.053; 29/890.036; 29/235; 29/446; 29/700; 29/530; 29/281.1; 29/281.5; 29/283.5; 138/114; 138/148; 138/149; 264/46.5; 264/46.7

(58) Field of Classification Search
USPC .............. 29/446, 700, 890.036, 890.032, 29/890.053, 235, 243.5, 281.1, 281.5, 29/283.5, 460, 530; 138/148, 149, 114; 264/46.5, 46.7
See application file for complete search history.

(56) References Cited

U.S. PATENT DOCUMENTS 2,634,759 A * 4/1953 Twickler ........................ 138/113
3,693,665 A * 9/1972 Veerling et al. ............... 138/149
(Continued)

FOREIGN PATENT DOCUMENTS

| EP | 1 699 611 B1 | 1/2008 |
| GB | 344356 | 3/1931 |
| WO | 00/47387 A1 | 8/2000 |

OTHER PUBLICATIONS

International Search Report for PCT/CH2010/000118 dated May 31, 2010.

*Primary Examiner* — Essama Omgba
*Assistant Examiner* — Darrell C Ford
(74) *Attorney, Agent, or Firm* — McCormick, Paulding & Huber, LLP

(57) ABSTRACT

During the manufacturing of heat-insulated pipes (1) with an inner duct (3) and an outer duct (2) and a foamed insulation (14) arranged in between, the inner duct is placed on a tension member (10). The latter is tensioned between tensioning means by means of a tensile force, such that it runs straight and that the inner duct is held straight. The latter is held on centering elements (16, 17) which are spaced from one another in a defined way by means of spacers (18). In this straight position the inner duct may be surrounded with foam inside of the outer duct, without needing spacers between the ducts.

7 Claims, 1 Drawing Sheet

(51) Int. Cl.
  *B23P 19/02* (2006.01)
  *B25B 27/14* (2006.01)
  *B23Q 3/00* (2006.01)
  *B23P 19/04* (2006.01)
  *B23P 19/00* (2006.01)
  *B23P 15/26* (2006.01)
  *B21D 53/00* (2006.01)
  *B29C 44/12* (2006.01)
  *B29C 33/30* (2006.01)
  *B29C 33/76* (2006.01)
  *F16L 59/14* (2006.01)

(56) References Cited

U.S. PATENT DOCUMENTS

| | | | | |
|---|---|---|---|---|
| 4,538,337 | A * | 9/1985 | Holbrook et al. | 29/445 |
| 4,793,404 | A * | 12/1988 | Hata | 165/104.26 |
| 5,056,209 | A * | 10/1991 | Ohashi et al. | 29/517 |
| 5,628,345 | A * | 5/1997 | Fisco | 138/98 |
| 6,199,595 | B1 * | 3/2001 | Baker | 138/149 |
| 6,382,259 | B1 * | 5/2002 | Codling | 138/149 |
| 6,926,040 | B1 * | 8/2005 | Prescott et al. | 138/148 |
| 7,451,541 | B2 * | 11/2008 | Stastny et al. | 29/890.036 |
| 7,699,078 | B1 * | 4/2010 | Husmann, Jr. | 138/114 |
| 7,814,655 | B2 * | 10/2010 | Schulz-Harder | 29/890.032 |
| 8,141,218 | B2 * | 3/2012 | Van Zandwijk | 29/234 |
| 8,397,765 | B2 * | 3/2013 | Jackson et al. | 138/149 |
| 2002/0195158 | A1 * | 12/2002 | Turner et al. | 138/155 |
| 2006/0131027 | A1 * | 6/2006 | Chiesa et al. | 166/367 |
| 2006/0156530 | A1 * | 7/2006 | Van Zandwijk | 29/455.1 |
| 2006/0283515 | A1 * | 12/2006 | Kanao | 138/133 |
| 2007/0074778 | A1 * | 4/2007 | Berti et al. | 138/145 |
| 2009/0000681 | A1 * | 1/2009 | Averbuch et al. | 138/112 |
| 2014/0202548 | A1 * | 7/2014 | Geerlings et al. | 137/1 |

* cited by examiner

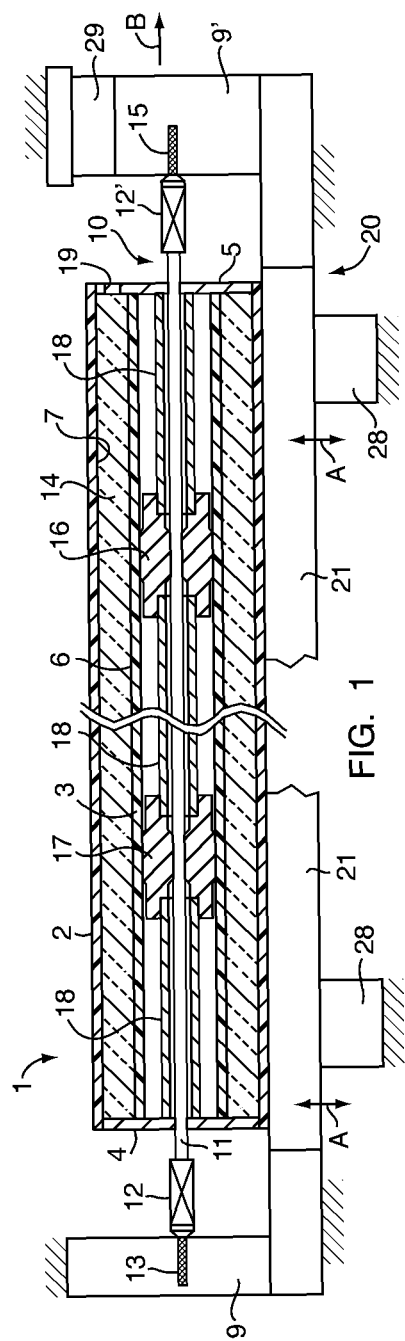
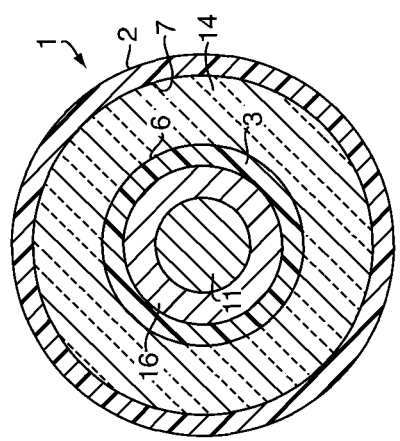

METHOD AND DEVICE FOR MANUFACTURING A HEAT-INSULATED PIPE

CROSS REFERENCE TO RELATED APPLICATIONS

This application claims the priority of European patent application No. 09 006 098.9, filed May 5, 2009 and PCT Application No. PCT/ CH2010 /000118 filed May 5, 2010, the disclosures of which are incorporated herein by reference in their entirety.

Field of the Invention

The invention is related to a method for the discontinuous manufacturing of a heat-insulated pipe, comprising the positioning of at least an inner duct in an outer duct so as to form a hollow space between the outer wall of the inner duct and the inner wall of the outer duct as well as the foaming of the hollow space. Furthermore, the invention is related to a device for manufacturing such pipes.

BACKGROUND OF THE INVENTION

The manufacturing of the pipes mentioned at the beginning is done in such a way that the inner duct is positioned into the outer duct by means of plastic spacing elements which are left in the finished pipe. Thereby, the arrangement of the spacing elements is complex and they form unwanted heat bridges or cold bridges respectively inside of the finished pipe. Additionally, the positioning of the inner duct is exact only at the spacing elements. Before the foaming, the inner duct can sag more or less between the spacing elements, this being only avoidable by a higher number of spacing elements. The foaming of the hollow space is done by means of a long foaming spear which is inserted into the hollow space between the inner and the outer duct from a first end and pushed forward until the closed second end. Subsequently, the foaming insulation material is brought in by means of the spear, wherein the spear is pulled back towards the first end, until the entire hollow space is filled with isolating foam in an as much as possible uniformly distributed way. The spacing elements are thereby formed and arranged in such a way that they don't interfere with the spear as much as possible; however, the insertion of the insulation is still complicated by the spacing elements. A device for tensioning a long spine is known from GB 344 356. The device is supposed to provide help during the manufacturing of flexible pipes by counteracting the sagging of the spine due to its own weight. From the international patent application WO 00/47387 a method and a device for the discontinuous manufacturing of heat-insulated pipes with an outer duct and an inner duct are known. Both ducts are aligned and centered prior to the foaming of the hollow space. In case of the inner duct, the aligning is done by applying a bending moment, being supposed to compensate the present sagging by the movement of the aligning and fixing elements. Optionally, a spacing element is used, which shall also make possible that both ducts are liftable from the outside.

SUMMARY OF THE INVENTION

The invention has the task of providing a method to avoid said disadvantages.

This is solved by the mentioned method by holding the inner duct substantially straight by means of a tensile force in longitudinal direction of the ducts and surrounding it with foam while being held in this way.

It was shown that the inner duct may be held straight inside of the outer duct by a tensile force even without spacing elements. By this, said disadvantages are eliminated. The straight shape of the inner duct may be achieved by means of the tensile force on the duct itself, which may be particularly applied in case of metal inner ducts. However, in a preferred embodiment the tensile force is not applied to the inner duct itself but to a tension member supporting the inner duct. Preferably, the tension member is arranged inside of the inner duct. Preferably, the tension member may be formed as a cable, particularly a steel cable, which may additionally carrying elements serving to support the inner duct at the cable and particularly to center the inner duct with respect to the cable.

In any case, the inner duct has to be held straight during the manufacturing step of surrounding it with foam or foaming the hollow space respectively. The inner duct is however held straight by the tensile force preferably already during the previous step of positioning it in the outer duct. For positioning, the position of the outer duct may then be adjusted with respect to the inner duct which is held straight in a fixed position. In another variant, the inner duct is brought into the desired position relatively to the outer duct by means of its ends only but in the state of not yet being held straight, after which positioning of the ends the inner duct is brought into the straight shape for the foaming by means of the tensile force.

In case of a preferred embodiment, first the inner duct is pushed on the elements of the tension member or the tension member is pulled through the inner duct respectively. After that, the inner duct is brought into the outer duct together with the tension member. Then, the inner duct is brought into the entirely straight shape by means of the tension member by applying the tensile force to the ends of the tension member and tensioning the latter to be straight, whereafter the positioning for forming the defined hollow space is carried out by changing the position of the outer duct until the desired position with respect to the firm positioned inner duct is reached. Centering elements are arranged on the tension member and they are spaced with respect to one another and to the frontal lids closing the ends of the ducts by means of spacers, this allowing a defined straight holding along the entire duct.

Furthermore, the invention has the task to provide a device for manufacturing heat-insulated pipes in case of which the mentioned disadvantages do not appear.

This task is solved by means of a device having a pipe holder extending in longitudinal direction of the pipe to be manufactured, tensioning means arranged on both sides of the longitudinal ends of the pipe holder, as well as at least one tension member connecting the tensioning means in a detachable way. The tensioning means comprises an actuator by means of which an adjustable tensile force is applied to the tension member, and the tension member is formed to support a duct along its longitudinal extension at least sectionwise. The tension member is formed by a steel cable having multiple centering elements along its longitudinal extension which are designated for the inner duct, and the centering elements are spaced from one another by means of spacers running coaxially to the steel cable.

BREIF DESCRIPTION OF THE DRAWINGS

In the following, embodiments of the invention will be further explained by means of the drawings.

FIG. 1 is a vertical section view through a pipe in longitudinal direction as well as the schematical device for its manufacturing; and in FIG. 2 is a vertical section view through the pipe in transverse direction.

DESCRIPTION OF THE PREFERRED EMBODIMENTS

FIG. 1 shows a vertical section through the longitudinal axis of a pipe with heat-insulation as it is manufactured according to the present invention. Furthermore, a preferred embodiment of the device for carrying out the method is schematically shown in the figure. In case of the method it is worked discontinuously, meaning that stationarily held single ducts of defined length are manufactured during the foaming.

Thereby, the pipe 1 has an outer duct 2 which normally consists of plastic, for example of polyethylene. An inner duct 3 is arranged inside of the outer duct, wherein the diameter of the inner duct is significantly lower than the diameter of the outer duct, such that during the manufacturing of the pipe first a hollow space is present between the inner wall 7 of the outer duct 2 and the outer wall 6 of the inner duct 3, which is filled with an insulating foam during the manufacturing, for example a polyurethane foam, such that after the foaming the hollow space is filled with the insulating material 14. This hardens and also constitutes, beside the heat-insulating layer, the fixing of the inner duct 3 inside of the outer duct 2.

For the manufacturing of such a pipe 1 the inner duct 3 has to be positioned and held inside of the outer duct 2 during the foaming. Thereby it is essential for guaranteeing homogeneous insulating characteristics of the finished pipe along its length that the inner duct runs as straight as possible in order for the hollow space to have as much as possible a uniform shape.

According to the invention, the holding of the inner duct 3 in a straight shape is done by applying a tensile force in longitudinal direction of the ducts. This tensile force enables that the inner duct 3 is itself tensioned or preferably a separate tension member 10 holding the inner duct is tensioned in such a way that it runs substantially straight and not in a sagging way. The appliance of a tensile force onto the inner duct 3 itself is particularly used if the inner duct is made of metal. Preferably, the inner duct is however also a plastic duct, for example an inner duct made of ABS (AcryInitrilbutadienacrylate). In this case, by applying a tensile force in longitudinal direction of the inner duct, a prolongation of the duct itself may take place, which is not desirable. Preferably, a separate tension member supporting the inner duct is therefore used. The tension member may be arranged outside of the inner duct and may for example be a metal band which may be tensioned in a straight way and which supports the inner duct. After the foaming, this band remains inside of the pipe 1. The preferred solution consists however in a tension member 10 which runs inside of the inner duct and which may therefore be removed from the inner duct after the foaming process or the hardening of the foam respectively.

In FIG. 1 an example is shown, where the tension member 10 is formed by a cable 11, particularly a steel cable. Along this cable, preferably elements, here the centering elements 16, 17 are arranged, which hold or support respectively the duct. The elements may be arranged from or fixed to the cable. Preferably, they encompass the cable in such a way that they are slidable on it. The mutual distance of the centering elements is preferably determined by spacers 18 which connect the elements, particularly the centering elements. Such spacers 18 may also be provided near the lids 4 and 5 which close the pipe frontally during the manufacturing in order to make possible the foaming. The firm spacers 18 position the centering elements exactly and therefore result in a very good straight holding of the inner duct 3. The already mentioned foaming spear is then inserted into the hollow space through at least one opening 19 in one of the lids in order to foam the hollow space. For this, the foaming spear is inserted from the opening 19 up to the opposed lid 4 and pulled back gradually during the emission of the foam out of the spear, until the entire hollow space is filled with foaming material. During this process the inner duct 3 is held straight on the tension member 10 which is tensioned by the tensile force and is also supported by it, such that it cannot be displaced by the foaming pressure. The outer duct 2, lying on the bed 21 of a pipe holder 20 not shown in detail in the shown device, is preferably also held in a fixed position. Thereby, the outer duct 2 is preferably fixed in its position at the pipe holder by means which are not shown, such that it cannot be displaced by the foaming pressure.

The tensile force on the tension member 10 is generated by arbitrary means which may be parts of the pipe holder or be separate means. For example this may take place, as shown, in such a way that the tension member 10 is fixed on one side in a device-fixed block 9' and on the other side in a block 9 which is movable in an actuated way in the direction of the arrow B (and also in the opposite direction). The actuation in the direction of the arrow B for tensioning the tension member 10 may be hydraulic, pneumatic or electromotive or if applicable also manual by an actuator 29 known to the skilled person. In case of a cable as tension member, respective cable sleeves 12, 12' with attaching means 13 and 15, like for example threads, may be provided for its fixation in the blocks 9' and 9 in order to attach the tension member in a detachable way to the means or to the elements 9, 9' respectively for applying the tensile force. By this, the tension member may simply be detached from the tension elements 9' and 9 in order to remove the finished pipe from the device, by moving back the block 9 in the opposite direction to the arrow B, such that the tension means is again released. After that the lids 4 and 5 are removed and the tension member 10 is pulled out of the inner duct 3 of the pipe 1. The centering elements 16 and 17 or the further centering elements respectively may be provided with an anti-slip coating or with rolling elements at their contact surface with the inner side of the inner duct 3, in order to facilitate the pulling out of the tension member from the inner duct.

Such embodiments of the centering elements 16, 17 also facilitate the insertion of the tension member into the inner duct 3. This process is carried out at the beginning of the manufacture of the pipe 1. In a preceding step or in a subsequent step, the outer duct 2 may be pushed over the inner duct 3. Such an entity consisting of an outer duct 2 and an inner duct 3 with the tension member 10 is then arranged within the device as shown, by attaching the tension member 10 to the tension elements 9' and 9. Furthermore, the outer duct is positioned in such a way or the pipe holder with the bed 21 is placed between the tensioning elements 9' and 9 in such a way that the outer duct lies on the bed 21. After that, it is normally proceeded in such a way that the tensile force is applied on the tension member 10 by actuating at least one of the tensioning elements 9' and 9 in order to tension the tension member and such that it runs completely straight between the elements or the tension blocks 9' and 9. The inner duct 3 runs also practically completely straight when enough tension leading to the straight run of tension member 10 is applied to it. Additionally, the inner duct 3 is thereby positioned in a fixed position by the tension member, because the latter is fixed in a fixed position between the elements 9, 9'. By sliding and lifting the bed 21 by means of actuators 28 which are only outlined, thus particularly in the direction of the arrow A as well as preferably also in the perpendicular direction to these arrows and perpendicular to the drawing plane, the outer duct 2 may be positioned at the straight and fixedly positioned inner duct 3, such that the hollow space is formed in the desired way. Normally, the positioning is done in a way that the hollow space has a uniform, annular shape. However, the method also allows in a simple way an uncentered arrangement of the inner duct 3 in the outer duct 2. Also, multiple inner ducts may be held tensioned straight with a distance from one another or sitting closely to each other by means of one or more tension members according to the invention in a simple way. When the positioning is finished, foam is inserted into the hollow space by means of the foaming spear in the described way.

In case of the stationary manufacturing of heat-insulated pipes with an inner duct and an outer duct and a foamed insulation situated there between, the inner duct is placed on a tension member. The latter is tensioned between tension means by means of a tensile force, such that it runs straight, such that also the inner duct is held straight. The latter is held on centering elements which are mutually spaced in a defined way by means of spacers. In this straight arrangement, the inner duct may be surrounded with foam without needing spacers between the ducts, which bother the foaming and which create a heat bridge in the finished pipe.

While preferred embodiments of the invention are described in the present patent application, it is noted that the invention is not limited to these embodiments but may also be carried out in different ways within the scope of the following claims.

The invention claimed is:

1. A method for manufacturing a heat-insulated pipe (1), comprising the positioning of at least one flexible inner duct (3) into an outer duct (2) creating a hollow space between an outer wall (6) of the inner duct (3) and an inner wall (7) of the outer duct (2) as well as the injecting of foam into the hollow space, characterized in that
   during the injecting of foam the inner duct (2) is held substantially straight in longitudinal direction of the ducts by means of a tensile force that is applied to a tension member (10) arranged running on the inside of the inner duct,
   the tension member comprises a cable (11) and a plurality of centering elements (16, 17),
   the centering elements are arranged coaxially to the cable for supporting the inner duct away from the cable, and are spaced from one another by means of fixed spacers (18) that define elongated hollow spaces between the centering elements,
   the tensile force holds the tension member straight so as to provide a straight shape to the inner duct that is supported by the tension member,
   while being held in this way, such that the inner duct cannot be displaced by a foaming pressure, the inner duct is surrounded with the injected foam, which then fixes together the inner duct with the outer duct to form the heat-insulated pipe, and
   the tension member is removed from the inner duct after the foaming.

2. The method according to claim 1, wherein the inner duct is held straight during the positioning step.

3. The method according to claim 1, wherein during the injecting of foam, the centering elements are spaced by means of spacers (18) from lids (4, 5) that frontally cover otherwise open ends of the hollow space between the inner duct and the outer duct.

4. The method according to claim 1, characterized by the steps of pushing the inner duct onto the tension member or of pulling the tension member into the inner duct, of inserting the inner duct together with the tension member into the outer duct, of tensioning the tension member by applying the tensile force and of positioning the outer duct and the inner duct for forming the defined hollow space by changing the position of the outer duct.

5. A device for carrying out the method according to claim 1 for manufacturing heat-insulated pipes (1), having an outer duct (2), at least one inner duct (3), as well as a foamed insulation (14) filling the space between the inner duct and the outer duct, the device comprising:
   a pipe holder (20, 21) extending in longitudinal direction of the pipe to be manufactured,
   tensioning means (9, 9') arranged on both sides of the longitudinal ends of the pipe holder,
   as well as at least one tension member (10) connecting the tensioning means in a detachable way,
   wherein the tensioning means comprise an actuator (29) by means of which an adjustable tensile force is applicable to the tension member, and wherein the tension member is formed to support a duct along its longitudinal extension at least sectionwise, wherein the tension member is formed by a cable (11) having along its longitudinal extension multiple centering elements (16, 17) that are designated for the inner duct, and wherein the centering elements are spaced from one another by means of spacers (18) running coaxially to the cable, which define elongated hollow spaces between the centering elements.

6. The device according to claim 5, wherein centering elements (16, 17) are spaced, by means of spacers (18) running coaxially to the cable (11), from lids (4, 5) arranged for frontally closing the inner duct and the outer duct.

7. The device according to claim 5, wherein the pipe holder has a bed (21) destined for the outer duct, and the bed is adjustable with respect to its position relative to the tension member.

* * * * *